US012807208B2

(12) United States Patent
Chi et al.

(10) Patent No.: US 12,807,208 B2
(45) Date of Patent: Nov. 24, 2026

(54) CHILD SEAT AND STROLLER THREE-IN-ONE APPARATUS

(71) Applicant: Zhejiang Boan Mother and Child Products Co., Ltd., Zhejiang (CN)

(72) Inventors: Ruiwei Chi, Wenzhou City (CN); Gangsheng Xiao, Wenzhou City (CN); Yunzhou Liu, Wenzhou City (CN)

(73) Assignee: Zhejiang Boan Mother and Child Products Co., Ltd., Wenzhou City (CN)

( * ) Notice: Subject to any disclaimer, the term of this patent is extended or adjusted under 35 U.S.C. 154(b) by 481 days.

(21) Appl. No.: 18/681,262

(22) PCT Filed: Dec. 18, 2023

(86) PCT No.: PCT/CN2023/139406
§ 371 (c)(1),
(2) Date: Feb. 5, 2024

(87) PCT Pub. No.: WO2024/217026
PCT Pub. Date: Oct. 24, 2024

(65) Prior Publication Data

US 2025/0171067 A1 May 29, 2025

(30) Foreign Application Priority Data

Nov. 27, 2023 (CN) ......................... 202323209712.8

(51) Int. Cl.
*B62B 7/08* (2006.01)
*B60N 2/28* (2006.01)
(Continued)

(52) U.S. Cl.
CPC ............ *B62B 7/083* (2013.01); *B60N 2/2848* (2013.01); *B62B 7/142* (2013.01); *B62B 7/145* (2013.01); *B62B 9/203* (2013.01)

(58) Field of Classification Search
CPC ......... B62B 7/083; B62B 7/142; B62B 7/145; B62B 7/12; B62B 7/08; B62B 7/06;
(Continued)

(56) References Cited

U.S. PATENT DOCUMENTS 3,829,113 A * 8/1974 Epelbaum ............ B60N 2/2839 280/30
6,286,844 B1 * 9/2001 Cone ......................... B62B 9/28 280/658
(Continued)

FOREIGN PATENT DOCUMENTS

CN 208291314 U 12/2018
CN 110803212 A 2/2020
(Continued)

*Primary Examiner* — James M Dolak
(74) *Attorney, Agent, or Firm* — MUNCY, GEISSLER, OLDS & LOWE, P.C.

(57) ABSTRACT

The present disclosure discloses a child seat and stroller three-in-one apparatus, and relates to the field of child seats. The apparatus includes a frame set and a basket set. The frame set is inserted and matched with the basket set; the frame set includes a base, front feet, rear feet, and lock pins; and rotating shafts are arranged on two sides of the base respectively, shaft holes in running fit with the rotating shafts are provided in upper ends of the front feet and the rear feet respectively, and the upper ends of the front feet and the rear feet are connected in series to and matched with the rotating shafts. The apparatus can achieve a three-in-one function of a child seat, a stroller, and a basket, may arbitrarily switch from the baby stroller to the child safety seat, and is stable in overall structure and very convenient to use.

9 Claims, 11 Drawing Sheets

(51) Int. Cl.
*B62B 7/14* (2006.01)
*B62B 9/20* (2006.01)

(58) Field of Classification Search
CPC .. B62B 7/062; B62B 7/04; B62B 7/00; B62B 2205/24; B62B 2205/20; B62B 2205/00; B62B 9/203; B62B 9/20; B62B 9/00; B60N 2/2848; B60N 2/2845; B60N 2/28; B60N 2/2842; B60N 2/26
See application file for complete search history.

(56) References Cited

U.S. PATENT DOCUMENTS

| | | | | |
|---|---|---|---|---|
| 8,286,990 | B2 * | 10/2012 | Tanizaki | B62B 7/145 280/643 |
| 9,725,106 | B2 * | 8/2017 | Pos | B62B 9/102 |
| 10,053,131 | B2 * | 8/2018 | Ruggiero | B62B 7/064 |
| 10,442,453 | B2 * | 10/2019 | Haut | B62B 7/062 |
| 10,899,377 | B2 * | 1/2021 | Eggert-Crowe | B62B 7/008 |
| 11,059,510 | B2 * | 7/2021 | Eyman | B62B 7/08 |
| 11,433,787 | B2 * | 9/2022 | Olfers | B62B 7/145 |
| 11,541,924 | B2 * | 1/2023 | Yi | B62B 7/064 |
| 11,932,300 | B1 * | 3/2024 | Jablonski | B60N 2/2821 |
| 12,240,518 | B2 * | 3/2025 | Zhong | B62B 7/142 |
| 12,570,190 | B2 * | 3/2026 | Saucier | B60N 2/2845 |
| 12,576,900 | B2 * | 3/2026 | Sack | B60N 2/2845 |
| 12,654,757 | B2 * | 6/2026 | Yi | B62B 7/142 |
| 2009/0121455 | A1 * | 5/2009 | Kretschmer | B62B 7/062 280/642 |

FOREIGN PATENT DOCUMENTS

| | | | |
|---|---|---|---|
| CN | 210161947 | U | 3/2020 |
| CN | 115120067 | A | 9/2022 |
| CN | 218750429 | U | 3/2023 |
| KR | 20130005146 | U | 8/2013 |

* cited by examiner

CHILD SEAT AND STROLLER THREE-IN-ONE APPARATUS

FIELD OF TECHNOLOGY

The present disclosure relates to the field of child seats, in particular to a child seat and stroller three-in-one apparatus.

BACKGROUND

A child safety seat is fixed to a car seat for use and is generally not removed, such that a tool such as a stroller or a basket needs to be additionally prepared after a child gets off a car. At present, there is an all-in-one safety seat, such as a car safety seat and a baby stroller disclosed in a patent document with a publication number of CN202222308870, in which a front wheel bracket needs to be fixed by a front lock hook, a rear wheel bracket needs to be fixed by a rear lock hook, a stroller mode needs to be controlled by a clutch mechanism, or another set of stroller frame is directly used, and various forms are quite troublesome to switch. This solution aims to provide another all-in-one deformable stroller and seat structure.

SUMMARY

To solve the above technical problem, the present disclosure provides a child seat and stroller three-in-one apparatus, which can achieve a three-in-one function of a child seat, a stroller, and a basket, may arbitrarily switch from the baby stroller to the child safety seat, and is stable in overall structure and very convenient to use.

To solve the technical problem, the present disclosure adopts the following technical solution: a child seat and stroller three-in-one apparatus is provided, including a frame set and a basket set, where the frame set is inserted and matched with the basket set;

the frame set includes a base, front feet, rear feet, and lock pins;

rotating shafts are arranged on two sides of the base respectively, shaft holes in running fit with the rotating shafts are provided in upper ends of the front feet and the rear feet respectively, and the upper ends of the front feet and the rear feet are connected in series to and matched with the rotating shafts; and the base on peripheries of the rotating shafts is axially provided with the lock pins in a sliding manner, first locking holes and second locking holes are provided in side surfaces of the upper ends of the front feet in a manner of corresponding to the lock pins, third locking holes and fourth locking holes are provided in side surfaces of the upper ends of the rear feet in a manner of corresponding to the lock pins, when the front feet and the rear feet are unfolded forwards and backwards, the lock pins simultaneously penetrate into the first locking holes and the third locking holes, and when both the front feet and the rear feet swing to a rear side of the basket set, the lock pins simultaneously penetrate into the second locking holes and the third locking holes.

When the frame set and the basket set are combined together, the apparatus can be used as a stroller, the basket set can be provided for a baby to lie or sit, and the frame set provides a function of movement. After being taken down from the frame set, a basket can be carried by hand like an ordinary basket, and after being folded, the front feet and the rear feet can be tied to a car seat with a safety belt.

Specifically, the function of movement can be provided after the front feet and the rear feet of the basket are unfolded; after the front feet and the rear feet are unfolded, the lock pins simultaneously penetrate into the first locking holes and the third locking holes, such that relative positions of the front feet and the rear feet are locked; and the lock pins are located on the base, such that relative positions of the front feet, the rear feet, and the base are all locked. In this case, the apparatus can be used as the stroller.

When the apparatus needs to serve as the basket to be fixed to the car seat, the lock pins are taken out from the first locking holes and the third locking holes, and then the front feet and the rear feet are swung; and when the front feet and the rear feet swing to the rear side of the basket set, the lock pins simultaneously penetrate into the second locking holes and the third locking holes, such that the front feet and the rear feet are locked on the rear side of the basket set.

Preferably, the lock pins are connected to first springs, the first springs drive the lock pins to move towards the front feet and the rear feet, the base is provided with a pull handle and steel wires, the pull handle is in sliding fit with the base and is connected to the lock pins through the steel wires, and when the pull handle is pulled, the steel wires drive the lock pins to move away from the front feet and the rear feet.

The lock pins can maintain a stable state of locking the relative positions of the front feet and the rear feet by the first springs, such that the lock pins are prevented from automatically sliding out after penetrating into the first locking holes and the third locking holes, or penetrating into the second locking holes and the fourth locking holes. The pull handle and the steel wires are connected to the lock pins, the pull handle can be pulled to drive the lock pins by using the steel wires to unlock the relative positions of the front feet and the rear feet, and the movement of the lock pins is controlled through the steel wires, such that the pull handle can be arranged more flexibly, making it easier for a user to control the movement of the lock pins.

Preferably, the base is provided with a fastening slot, a double lock catch is provided and includes a hanging and fastening end and an operating end, the double lock catch is hinged to the pull handle, and a first elastic element is arranged between the double lock catch and the pull handle, and drives the hanging and fastening end of the double lock catch to be hung in the fastening slot. Without external interference, the hanging and fastening end of the double lock catch is hung in the fastening slot under the action of the first elastic element. Because the double lock catch is hinged relative to the pull handle, the pull handle will be locked to the base by the double lock catch. When the pull handle needs to be pulled, the operating end of the double lock catch can be pressed to separate the hanging and fastening end from the fastening slot, the locking between the pull handle and the base is released, and then the handle can be pulled to unlock the relative positions of the front feet and the rear feet, which can prevent the pull handle from being pulled due to misoperation, making it safer to use.

Preferably, second springs are arranged between the front feet and the rear feet, and push the front feet and the rear feet to expand. The second springs can provide unfolding force between the front feet and the rear feet, making it more convenient for the front feet and the rear feet to unfold, and providing more stable support for the basket set.

Preferably, arc-shaped slots are provided in end surfaces, close to the rear feet, of the front feet, have the same axis as the rotating shafts, and connect the first locking holes to the second locking holes in series, arc-shaped plates are provided on end surfaces, close to the front feet, of the rear feet in a manner of corresponding to the arc-shaped slots, each of the arc-shaped plates is high in a middle and low on two sides, and the arc-shaped plates are located between the third locking holes and the fourth locking holes.

During rotation of the front feet and the rear feet, the arc-shaped plates slide in the arc-shaped slots. Because the arc-shaped plates are located between the third locking holes and the fourth locking holes, the arc-shaped plates do not interfere with the lock pins when the lock pins penetrate into the third locking holes or the fourth locking holes.

During the process from the state that the lock pins penetrate into the third locking holes or the fourth locking holes to the state that the front feet and the rear feet swing relatively, the lock pins are pulled out from the third locking holes or the fourth locking holes and move back. The arc-shaped plates will pass through the first locking holes or the second locking holes. Because each arc-shaped plate is high in the middle and low on the two sides, the arc-shaped plates will gradually further push the lock pins to move back.

The lock pins are provided with the first elastic elements for forward pushing, such that when the arc-shaped plates pass through the first locking holes or the second locking holes, there will be significant damping, that is, the arc-shaped plates will bring significant damping during the process of switching a relative state of the front feet and the rear feet from one to another, the front feet and the rear feet can be prevented from automatically changing a relative angle, and the front feet and the rear feet remain stable.

Preferably, the basket set includes a basket body, and connecting seats detachably connected to the basket body are upwards arranged on two sides of the base respectively. In this way, more stable support is provided for the basket set.

Preferably, connecting tables and handle connectors are arranged on two sides of the basket body respectively, one end of each of the handle connectors is in running fit with a corresponding one of the connecting tables, and the handle connectors are provided with connecting cavities inserted and matched with handles. Two ends of each handle are inserted into the corresponding handle connector, and the handle connectors are in running fit with the connecting tables, such that the handles can be adjusted in angle relative to the basket body.

Preferably, a plurality of positioning slots are distributed in a side surface of each of the connecting tables, buttons are further provided and hinged relative to the handle connectors, each of the buttons includes a pressing end and a clamping jaw end, second elastic elements are arranged between the buttons and the handle connectors, and each of the second elastic elements pushes the clamping jaw end to be adapted to any one of the positioning slots; and after the pressing ends are pressed, the clamping jaw ends are separated from the positioning slots to unlock relative angles between the handle connectors and the connecting tables, the handle connectors are rotated, and after the clamping jaw ends are adapted to other positioning slots, the relative angles between the handle connectors and the connecting tables are locked again.

The buttons are arranged on the handle connectors, and the clamping jaw ends can be adapted to any positioning slots, such that when the clamping jaw ends are separated from the positioning slots, the handle connectors and the connecting tables can rotate mutually to change an angle, and when the clamping jaw ends are pushed by the second elastic elements to be adapted to the positioning slots, the handle connectors cannot rotate relative to the connecting tables. Specifically, the buttons maintain a trend of adaptively swinging the clamping jaw ends towards the positioning slots through the second elastic elements. Once the handle connectors rotate to move the clamping jaw ends to any positioning slots, the second elastic elements will push the clamping jaw ends of the buttons to be clamped into the positioning slots, the pressing ends of the buttons are pressed to separate the clamping jaw ends from the positioning slots, and then the handle connectors can rotate relative to the basket body.

Preferably, the buttons are provided with hanging tables, lock plates are further provided and hinged to the handle connectors, and third elastic elements are provided between the lock plates and the handle connectors;

hooks are arranged on side edges of front ends of the lock plates, the hooks of the lock plates are pushed by the third elastic elements to be adapted to the hanging tables, and the hooks are configured to limit the pressing ends to be pressed;

front ends of the third elastic elements are pushed by the third elastic elements to swing into the connecting cavities; and when the handles are inserted into the connecting cavities, front ends of the handles push the front ends of the lock plates to swing, such that the hooks are separated from the hanging tables.

The lock plates have two states. In a first state, the handles are not inserted into the connecting cavities of the handle connectors; the hooks of the lock plates hook the hanging tables of the buttons under the action of elastic force of the third elastic elements; the front ends of the lock plates swing and extend into the connecting cavities of the handle connectors; because the hooks of the lock plates hook the hanging tables, the buttons cannot be pressed normally, and the clamping jaw ends cannot be separated from the positioning slots, that is, the handle connectors cannot rotate relative to the connecting tables in the case where the handles are not inserted into the connecting cavities of the handle connectors. In a second state, the handles are inserted into the connecting cavities of the handle connectors; during the process that the handles are inserted into the connecting cavities, the lock plates are pushed to swing, and the front ends of the lock plates are pushed out from the connecting cavities; after the front ends of the lock plates are pushed out, the hooks of the lock plates are separated from the hanging tables, and the buttons can be pressed; and after the buttons are pressed, the clamping jaw ends can be separated from the positioning slots, that is, the handle connectors can rotate relative to the connecting tables in the case where the handles are inserted into the connecting cavities of the handle connectors, thereby preventing the handles from being accidentally touched to swing.

Preferably, clamping slots are provided in side surfaces of the front ends of the handles, guide arc slots are provided in end surfaces of the connecting tables, axes of the guide arc slots are as same as rotation axes of the handle connectors, and each of the guide arc slots includes a clamping section and a shallower separating section;

limit elements and precompressed springs are further provided, the clamping slots and the guide arc slots are located on same sides of the limit elements, the limit elements are provided with clamping ends corresponding to the clamping slots and guide ends corresponding to the guide arc slots and are in sliding fit relative to the handle connectors, and the precompressed springs are arranged between the limit elements and the handle connectors, and push the limit elements to slide towards the clamping slots and the guide arc slots; and when the guide ends are matched with the clamping sections, the clamping ends are adapted to the clamping slots, and when the guide ends are matched with the separating sections, the clamping ends are separated from the clamping slots.

The limit elements are in sliding fit relative to the handle connectors, and the precompressed springs push the limit elements to slide towards the clamping slots and the guide arc slots. When the guide ends are matched with the clamping sections, because the clamping sections are deeper, the limit elements can be adaptively pushed by the precompressed springs to cause the clamping ends to be adapted to the clamping slots. When the guide ends are matched with the separating sections, the separating sections are shallower and push the guide ends, such that the limit elements can overcome pushing force of the precompressed springs to separate the clamping ends from the clamping slots, that is, the clamping ends and the guide ends get close to or away from the clamping slots and the guide arc slots synchronously. The positions of the guide ends in the guide arc slots are obtained by rotating the handle connectors. When the guide ends rotate to the separating sections, the clamping ends are separated from the clamping slots, and the front ends of the handles are not limited by the clamping ends and can be pulled out from the connecting cavities.

The present disclosure has the following beneficial effects:

With this solution, the apparatus can achieve a three-in-one function of a child seat, a stroller, and a basket, and may arbitrarily switch from the baby stroller to the child safety seat; the functions of the basket and the stroller are achieved through separation and combination of the frame set and the basket set; the apparatus can be combined with a car seat by folding the frame set and adjusting an angle of the handles to achieve the effect of the child safety seat; and the apparatus is stable in overall structure, easy to deform, and very convenient to use.

BRIEF DESCRIPTION OF THE DRAWINGS

To more clearly illustrate the technical solutions in the embodiments of the present disclosure or in the prior art, the accompanying drawings that need to be used in the description of the embodiments will be briefly described below. Apparently, the accompanying drawings in the description below are merely 14 drawings of the present disclosure. Those of ordinary skill in the art may also derive other accompanying drawings from these accompanying drawings without creative efforts.

Figure 1:
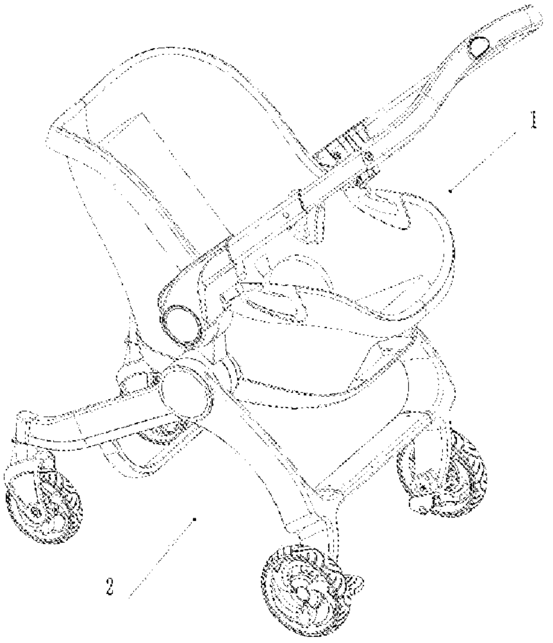
FIG. 1 is a three-dimensional view of a frame set and a basket set after being assembled according to an embodiment of the present disclosure.

In the drawings: 1. frame set; 101. base; 102. rotating shaft; 103. lock pin; 104. front foot; 105. rear foot; 106. first spring; 107. first locking hole; 108. second locking hole; 109. third locking hole; 110. fourth locking hole; 111. pull handle; 112. steel wire; 113. fastening slot; 114. first elastic element; 115. double lock catch; 116. hanging and fastening end; 117. operating end; 118. second spring; 119. arc-shaped slot; 120. arc-shaped plate; 121. connecting seat; 122. lower hook; 123. upper hook; 2. basket set; 201. basket body; 202. handle; 203. connecting table; 204. handle connector; 205. connecting cavity; 206. positioning slot; 207. button; 208. pressing end; 209. clamping jaw end; 210. second elastic element; 211. lock plate; 212. hook; 213. hanging table; 214. third elastic element; 215. clamping slot; 216. guide arc slot; 217. clamping section; 218. separating section; 219. limit element; 220. clamping end; 221. guide end; and 222. embedded slot.

DESCRIPTION OF THE EMBODIMENTS

In order to deepen the understanding of the present disclosure, the present disclosure will be further described in detail below with reference to the accompanying drawings and an embodiment. The embodiment is only used to explain the present disclosure and does not limit the scope of protection of the present disclosure.

Embodiment

Figure 2:
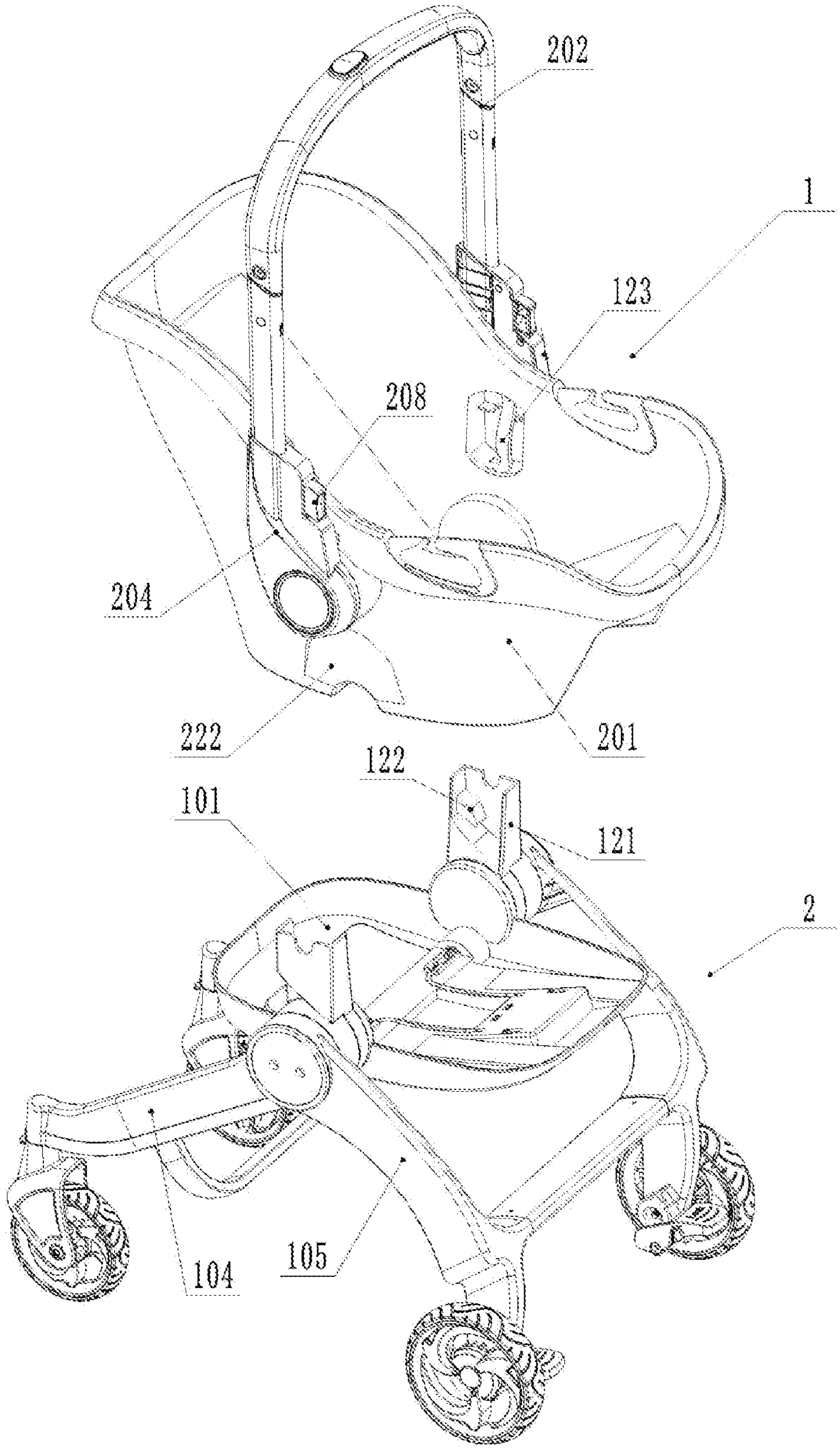
FIG. 2 is a three-dimensional view of a frame set and a basket set after being separated according to an embodiment of the present disclosure.

As shown in FIG. 1 and FIG. 2, a child seat and stroller three-in-one apparatus includes a frame set 1 and a basket set 2; the frame set 1 is inserted and matched with the basket set 2; and the frame set 1 includes a base 101, front feet 104, rear feet 105, and lock pins 103.

Rotating shafts 102 are arranged on two sides of the base 101 respectively, shaft holes in running fit with the rotating shafts 102 are provided in upper ends of the front feet 104 and the rear feet 105 respectively, and the upper ends of the front feet 104 and the rear feet 105 are connected in series to and matched with the rotating shafts 102.

Figure 3:
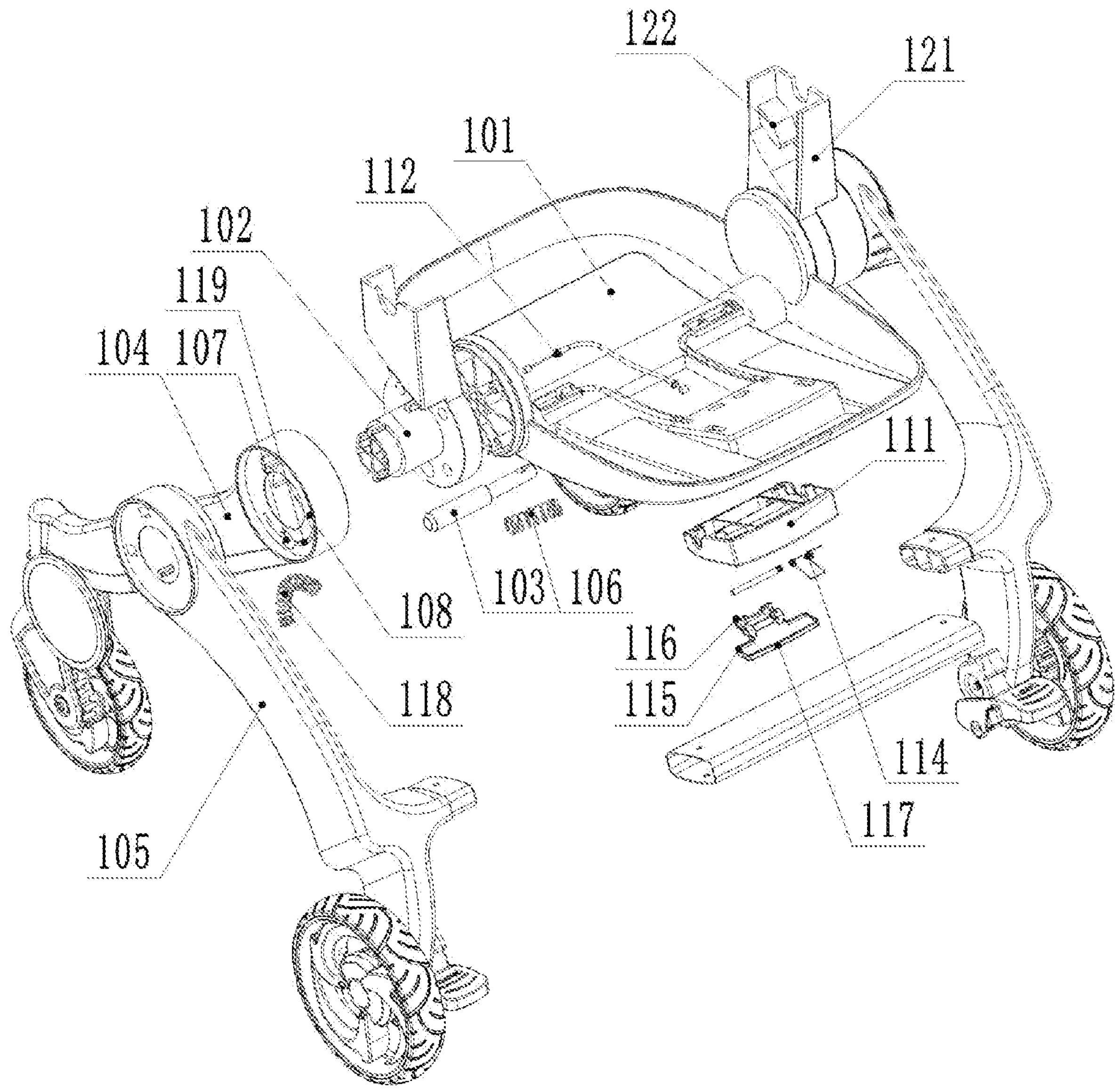
FIG. 3 is an exploded view of a matching structure of front sheet, rear feet, and a base according to an embodiment of the present disclosure.
Figure 4:
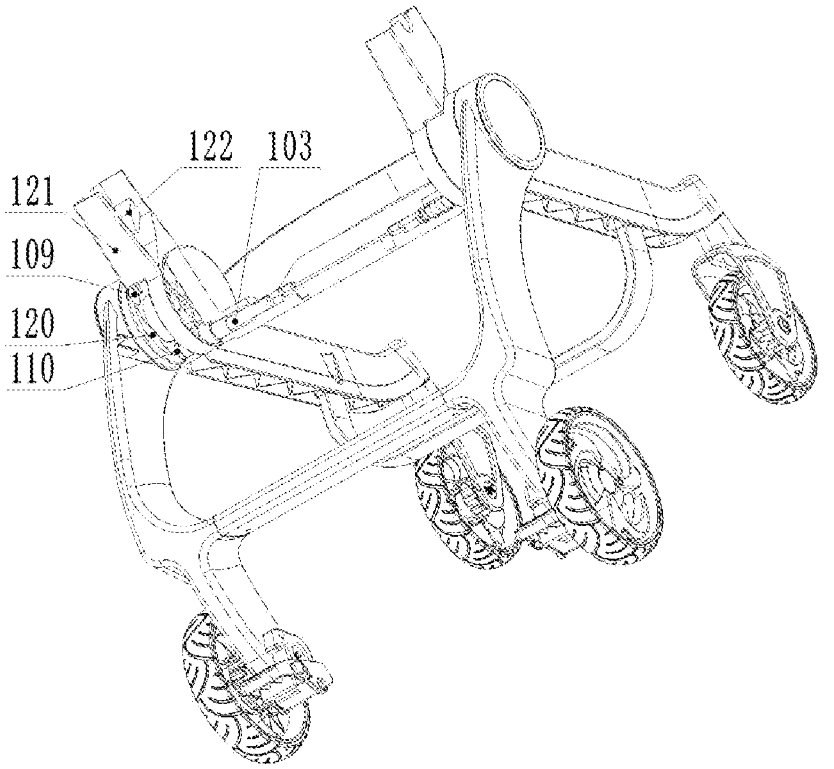
FIG. 4 is a three-dimensional view of a lower side of a frame set according to an embodiment of the present disclosure.
Figure 5:
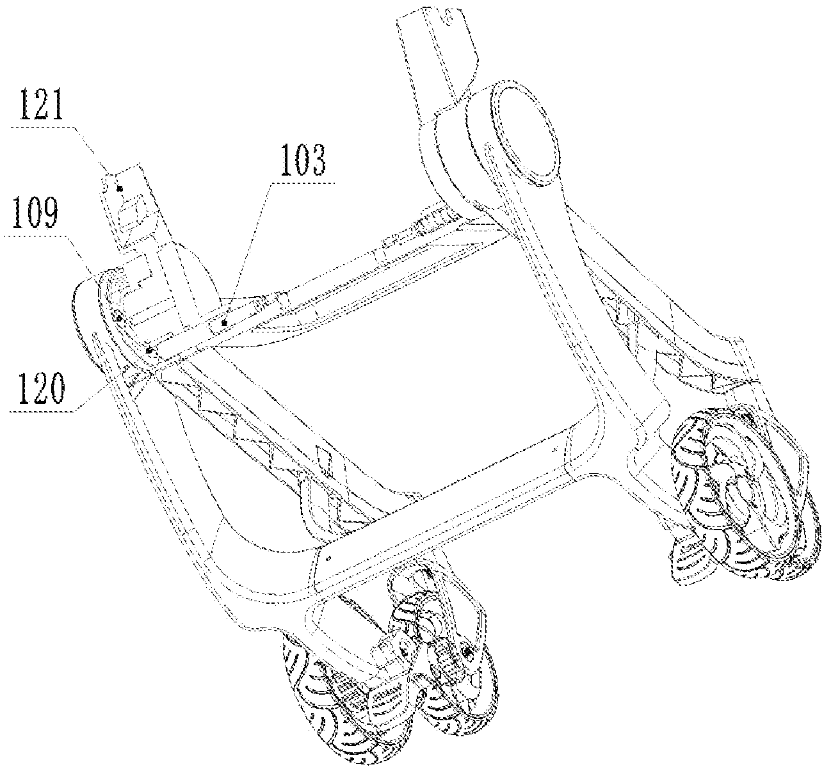
FIG. 5 is a sectional view of a three-dimensional part of a lower side of a frame set according to an embodiment of the present disclosure.

As shown in FIG. 2 to FIG. 4, the base 101 on peripheries of the rotating shafts 102 is axially provided with the lock pins 103 in a sliding manner, first locking holes 107 and second locking holes 108 are provided in side surfaces of the upper ends of the front feet 104 in a manner of corresponding to the lock pins 103, third locking holes 109 and fourth locking holes 110 are provided in side surfaces of the upper ends of the rear feet 105 in a manner of corresponding to the lock pins 103, when the front feet 104 and the rear feet 105 are unfolded forwards and backwards, the lock pins 103 simultaneously penetrate into the first locking holes 107 and the third locking holes 109, and when both the front feet 104 and the rear feet 105 swing to a rear side of the basket set 2, the lock pins 103 simultaneously penetrate into the second locking holes 108 and the third locking holes 109. That is, the first locking holes 107, the second locking holes 108, the third locking holes 109, the fourth locking holes 110, and the lock pins 103 are parallel to an axis of the rotating shaft 102 and have an equal parallel distance from the axis of the rotating shaft 102. Therefore, only when the front feet and the rear feet 105 rotate, the first locking holes 107 and the second locking holes 108 can coincide with the third locking holes 109 and the fourth locking holes 110, and when the positions of the lock pins 103 coincide, the lock pins 103 can connect them in series.

Figure 7:
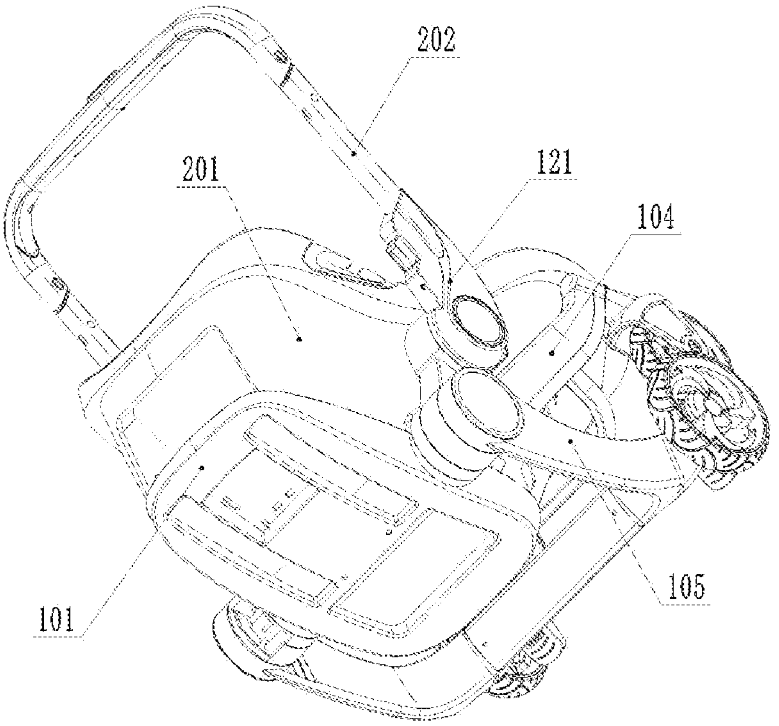
FIG. 7 is a three-dimensional bottom view that a frame set is folded in a basket set according to an embodiment of the present disclosure.
Figure 9:
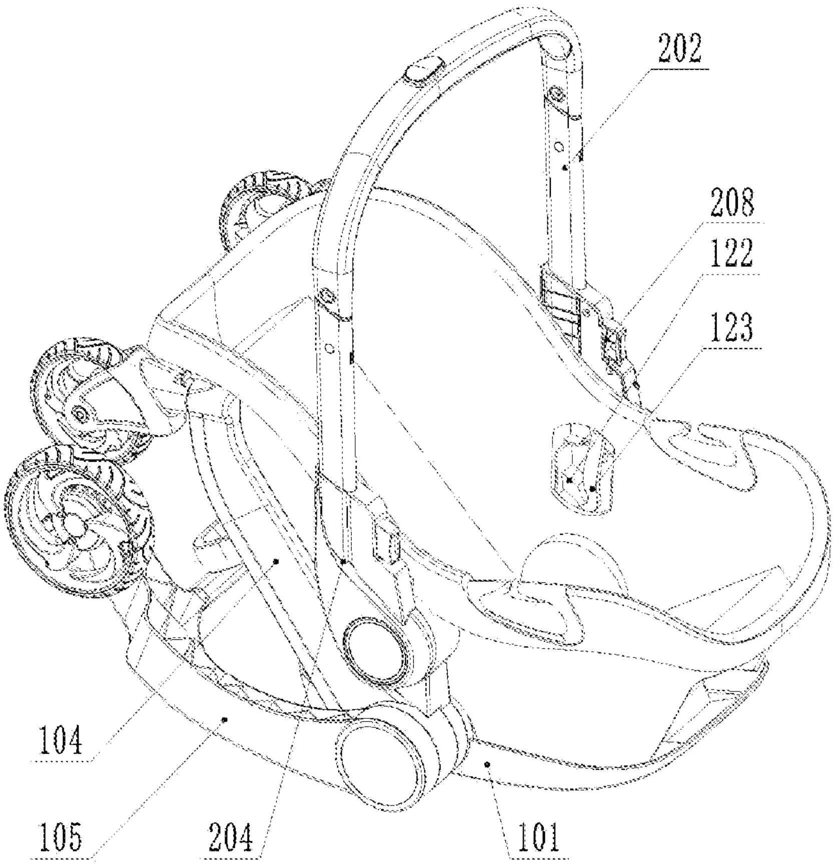
FIG. 9 is a three-dimensional top view that a frame set is folded in a basket set according to an embodiment of the present disclosure.

As shown in FIG. 7 and FIG. 9, when the frame set 1 and the basket set 2 are combined together, the apparatus can be used as a stroller, the basket set 2 can be provided for a baby to lie or sit, and the frame set 1 provides a function of movement. After being taken down from the frame set 1, a basket can be carried by hand like an ordinary basket, and after being folded, the front feet 104 and the rear feet 105 can be tied to a car seat with a safety belt.

The base 101 provides support for the basket set 2 on one hand and is used as a main structure of the frame set 1 on the other hand.

Specifically, the function of movement can be provided after the front feet 104 and the rear feet 105 of the basket are unfolded; after the front feet 104 and the rear feet 105 are unfolded, the lock pins 103 simultaneously penetrate into the first locking holes 107 and the third locking holes 109, such that relative positions of the front feet 104 and the rear feet 105 are locked; and the lock pins 103 are located on the base 101, such that relative positions of the front feet 104, the rear feet 105, and the base 101 are all locked. In this case, the apparatus can be used as the stroller.

When the apparatus needs to serve as the basket to be fixed to the car seat, the lock pins 103 are taken out from the first locking holes 107 and the third locking holes 109, and then the front feet 104 and the rear feet 105 are swung; and when the front feet and the rear feet swing to the rear side of the basket set 2, the lock pins 103 simultaneously penetrate into the second locking holes 108 and the third locking holes 109, such that the front feet 104 and the rear feet 105 are locked on the rear side of the basket set 2.

Figure 6:
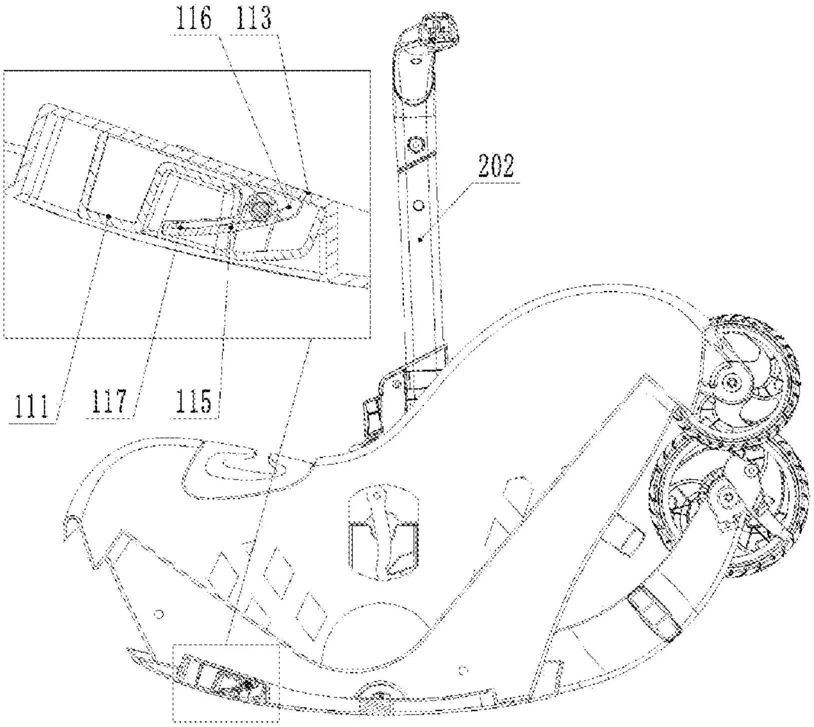
FIG. 6 is a sectional view of a basket set according to an embodiment of the present disclosure.

As shown in FIG. 6, the lock pins 103 are connected to first springs 106, the first springs 106 drive the lock pins 103 to move towards the front feet 104 and the rear feet 105, the base 101 is provided with a pull handle 111 and steel wires 112, the pull handle 111 is in sliding fit with the base 101 and is connected to the lock pins 103 through the steel wires 112, and when the pull handle 111 is pulled, the steel wires 112 drive the lock pins 103 to move away from the front feet 104 and the rear feet 105. Specifically, the pull handle 111 is arranged at a position, close to a front part, of a bottom of the base 101. The pull handle 111 is operated on one side. The steel wires 112 are similar to bicycle brake cables in principle and can remotely control sliding of the lock pins 103.

The lock pins 103 can maintain a stable state of locking the relative positions of the front feet 104 and the rear feet 105 by the first springs 106, such that the lock pins are prevented from automatically sliding out after penetrating into the first locking holes 107 and the third locking holes 109, or penetrating into the second locking holes 108 and the fourth locking holes 110. The pull handle 111 and the steel wires 112 are connected to the lock pins 103, the pull handle 111 can be pulled to drive the lock pins 103 by using the steel wires 112 to unlock the relative positions of the front feet 104 and the rear feet 105, and the movement of the lock pins 103 is controlled through the steel wires 112, such that the pull handle 111 can be arranged more flexibly, making it easier for a user to control the movement of the lock pins 103.

The base 101 is provided with a fastening slot 113, a double lock catch 115 is provided and includes a hanging and fastening end 116 and an operating end 117, the double lock catch 115 is hinged to the pull handle 111, a first elastic element 114 is arranged between the double lock catch 115 and the pull handle 111, and drives the hanging and fastening end 116 of the double lock catch 115 to be hung in the fastening slot 113, a groove is provided in a lower surface of the base 101, the pull handle 111 and the double lock catch 115 are located in the groove, and the fastening slot 113 is located in the groove. Without external interference, the hanging and fastening end 116 of the double lock catch 115 is hung in the fastening slot 113 under the action of the first elastic element 114. Because the double lock catch 115 is hinged relative to the pull handle 111, the pull handle 111 will be locked to the base 101 by the double lock catch 115. When the pull handle 111 needs to be pulled, the operating end 117 of the double lock catch 115 can be pressed to separate the hanging and fastening end 116 from the fastening slot 113, the locking between the pull handle 111 and the base 101 is released, and then the handle 111 can be pulled to unlock the relative positions of the front feet 104 and the rear feet 105, which can prevent the pull handle 111 from being pulled due to misoperation, making it safer to use.

Second springs 118 are arranged between the front feet 104 and the rear feet 105, and push the front feet 104 and the rear feet 105 to expand. The second springs 118 can provide unfolding force between the front feet 104 and the rear feet 105, making it more convenient for the front feet 104 and the rear feet 105 to unfold, and providing more stable support for the basket set 2. Specifically, inner cavities are provided in relative inner sides of the upper ends of the front feet 104 and the rear feet 105, the second springs 118 are located in the inner cavities, two ends of each second spring 118 abut against the front foot 104 and the rear foot 105, and the springs are extended or compressed when the front feet 104 and the rear feet 105 swing relatively.

Arc-shaped slots 119 are provided in end surfaces, close to the rear feet 105, of the front feet 104, have the same axis as the rotating shafts 102, and connect the first locking holes 107 to the second locking holes 108 in series, arc-shaped plates 120 are provided on end surfaces, close to the front feet 104, of the rear feet 105 in a manner of corresponding to the arc-shaped slots 119, each of the arc-shaped plates 120 is high in a middle and low on two sides, and the arc-shaped plates 120 are located between the third locking holes 109 and the fourth locking holes 110.

During rotation of the front feet 104 and the rear feet 105, the arc-shaped plates 120 slide in the arc-shaped slots 119. Because the arc-shaped plates 120 are located between the third locking holes 109 and the fourth locking holes 110, the arc-shaped plates 120 do not interfere with the lock pins 103 when the lock pins 103 penetrate into the third locking holes 109 or the fourth locking holes 110.

During the process from the state that the lock pins 103 penetrate into the third locking holes 109 or the fourth locking holes 110 to the state that the front feet 104 and the rear feet 105 swing relatively, the lock pins 103 are pulled out from the third locking holes 109 or the fourth locking holes 110 and move back. The arc-shaped plates 120 will pass through the first locking holes 107 or the second locking holes 108. Because each arc-shaped plate 120 is high in the middle and low on the two sides, the arc-shaped plates 120 will gradually further push the lock pins 103 to move back.

The lock pins 103 are provided with the first elastic elements 114 for forward pushing, such that when the arc-shaped plates 120 pass through the first locking holes 107 or the second locking holes 108, there will be significant damping, that is, the arc-shaped plates 120 will bring significant damping during the process of switching a relative state of the front feet 104 and the rear feet 105 from one to another, the front feet 104 and the rear feet 105 can be prevented from automatically changing a relative angle, and the front feet 104 and the rear feet 105 remain stable. Specifically, an edge of each arc-shaped plate 120 is of an inclined edge structure with high middle and low two sides, and the front ends of the lock pins 103 are set as arc surfaces, such that when the arc-shaped plates 120 slide in the arc-shaped slots 119, the inclined edge structures can better push the front ends of the lock pins 103.

Figure 8:
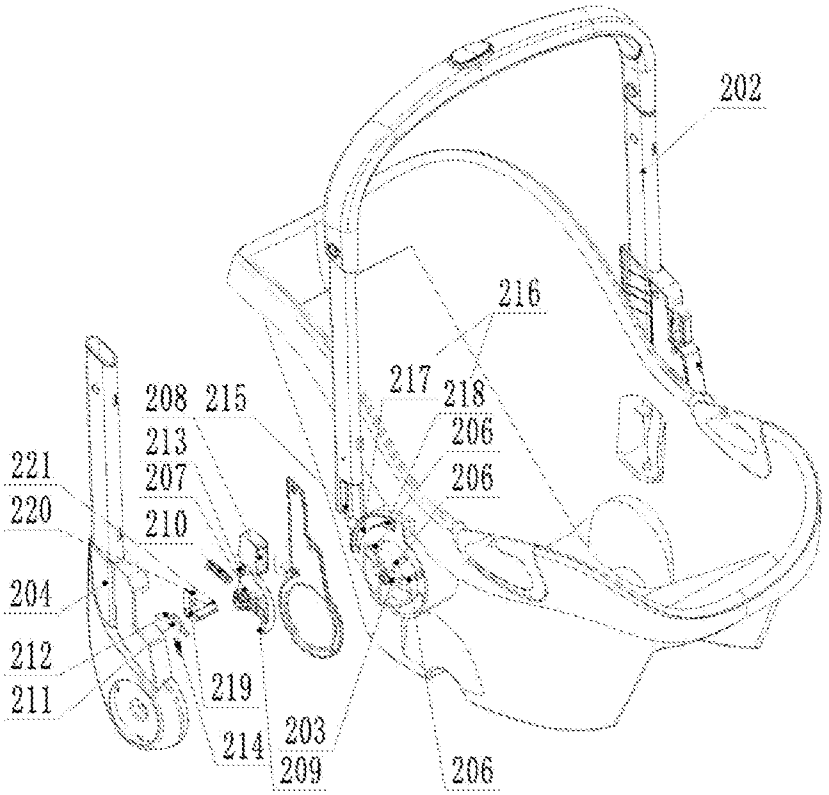
FIG. 8 is an exploded view of a connecting structure of a handle on one side of a basket set according to an embodiment of the present disclosure.

As shown in FIG. 2 and FIG. 8, the basket set 2 includes a basket body 201, and connecting seats 121 detachably connected to the basket body 201 are upwards arranged on two sides of the base 101 respectively. In this way, more stable support is provided for the basket set 2. The connecting seats 121 are provided with lower hooks 122, embedded slots 222 adapted to the connecting seats 121 are provided in two sides of the basket body 201, and upper hooks 123 (the upper hooks 123 and the lower hooks 122 are arranged on inner sides of connecting tables for convenient demolding in figure) adapted to the lower hooks 122 are arranged in the embedded slots 222.

Connecting tables 203 and handle connectors 204 are arranged on two sides of the basket body 201 respectively, one end of each of the handle connectors 204 is in running fit with a corresponding one of the connecting tables 203, and the handle connectors 204 are provided with connecting cavities 205 inserted and matched with handles 202. Two ends of each handle 202 are inserted into the corresponding handle connector 204, and the handle connectors 204 are in running fit with the connecting tables 203, such that the handles 202 can be adjusted in angle relative to the basket body 201. Specifically, side cavities in running fit with the connecting tables 203 are provided in side surfaces of lower ends of the handle connectors 204, and the handle connectors 204 swing forwards and backwards on the connecting tables 203.

Figure 10:
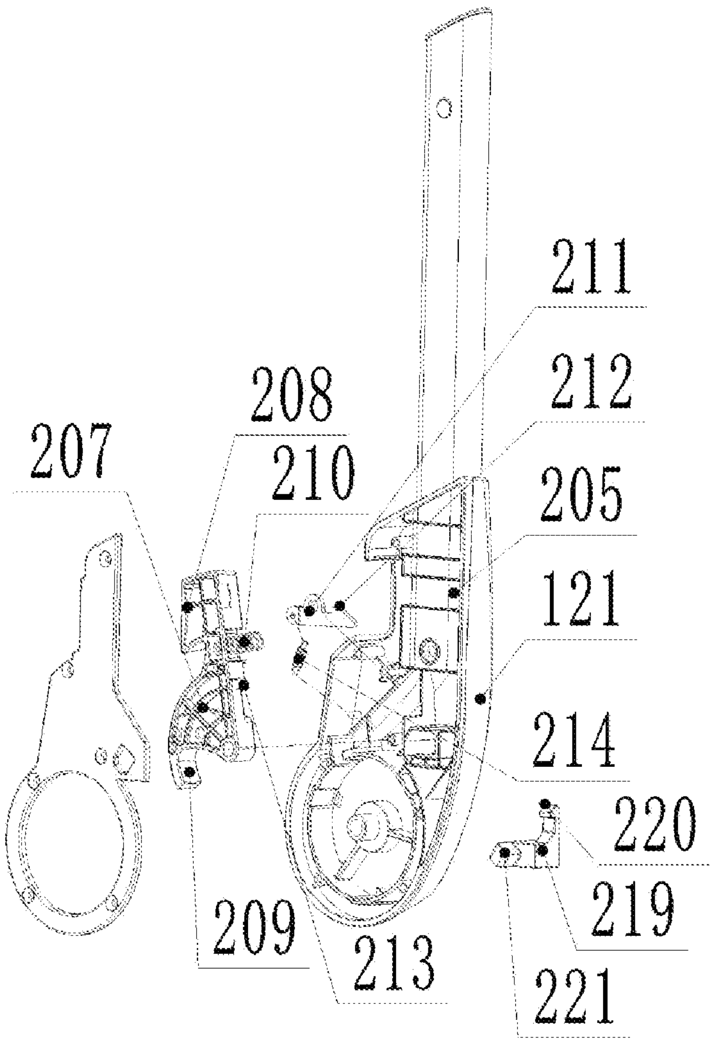
FIG. 10 is an exploded view that a handle connector is connected to a basket body according to an embodiment of the present disclosure.
Figure 11:
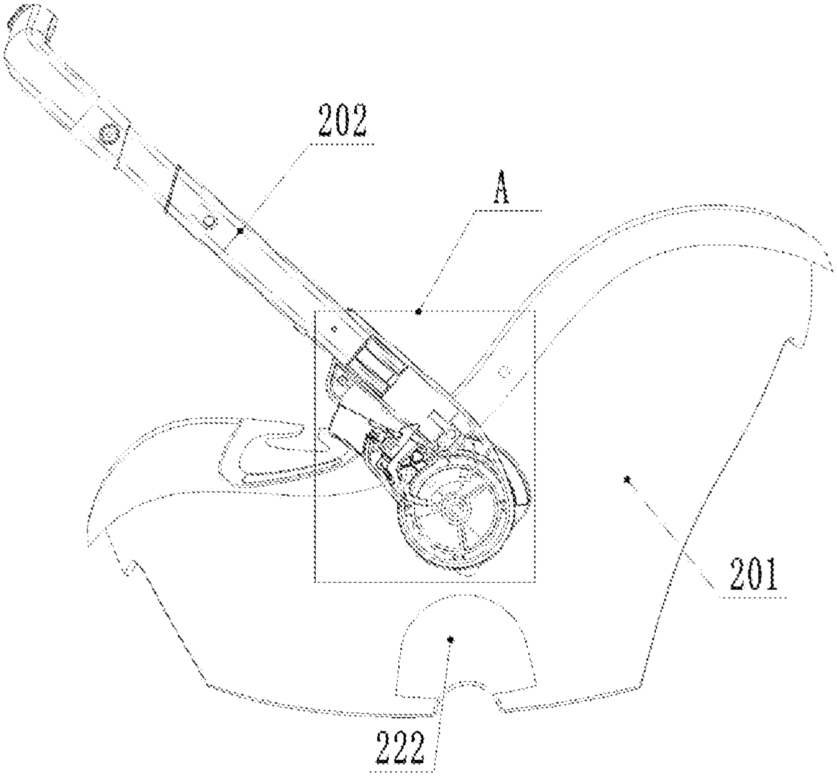
FIG. 11 is a schematic diagram that a handle swings forwards according to an embodiment of the present disclosure.
Figure 12:
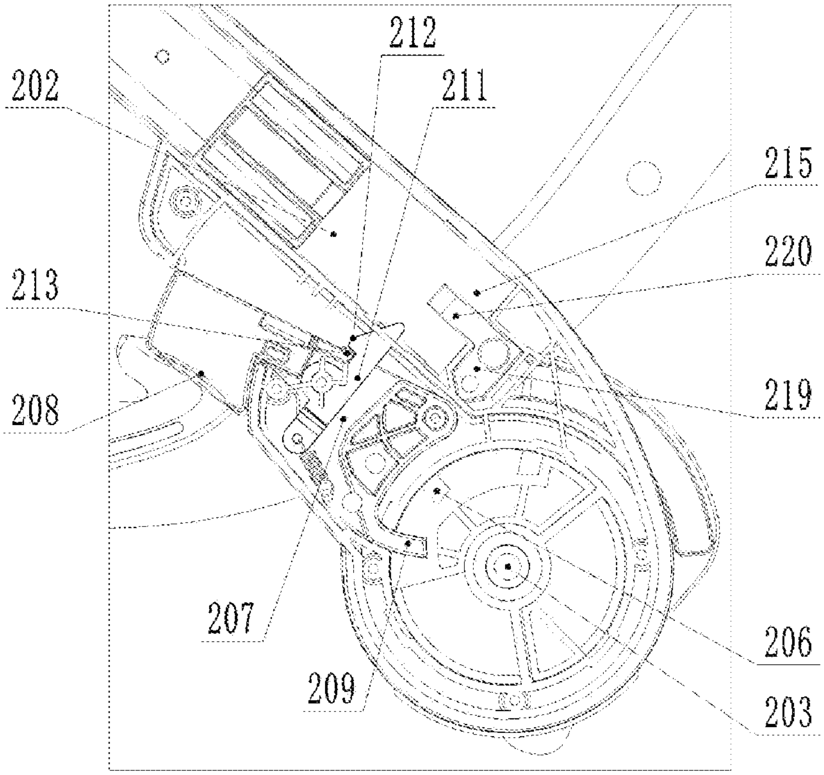
FIG. 12 is a partial enlarged view of A in FIG. 11 according to an embodiment of the present disclosure.
Figure 13:
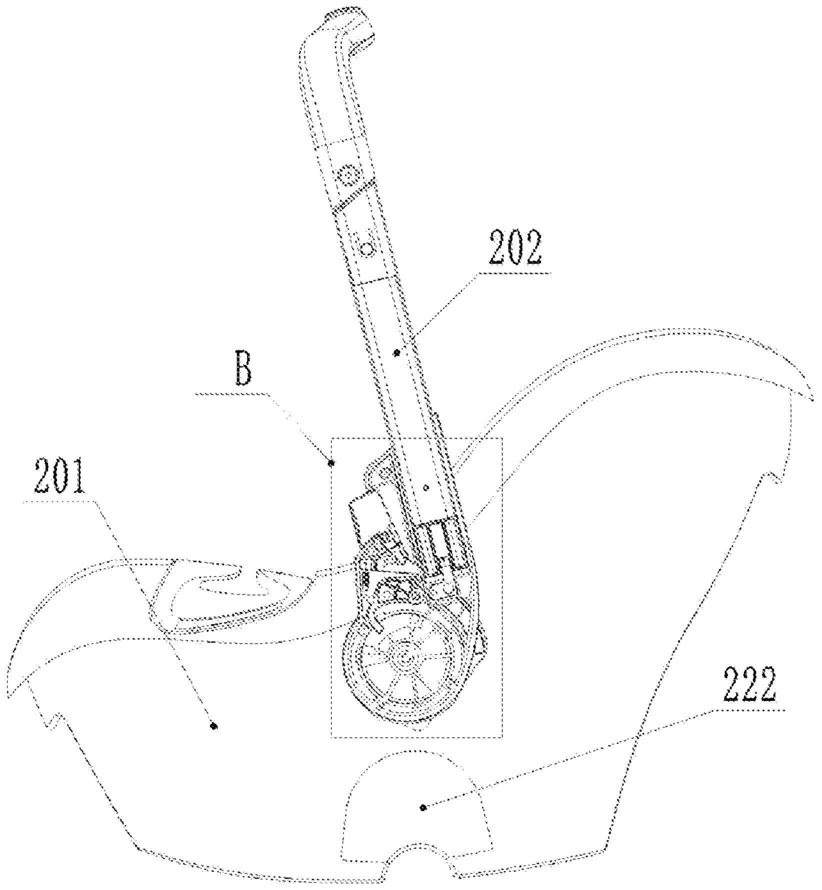
FIG. 13 is a schematic diagram that a handle swings up according to an embodiment of the present disclosure.
Figure 14:
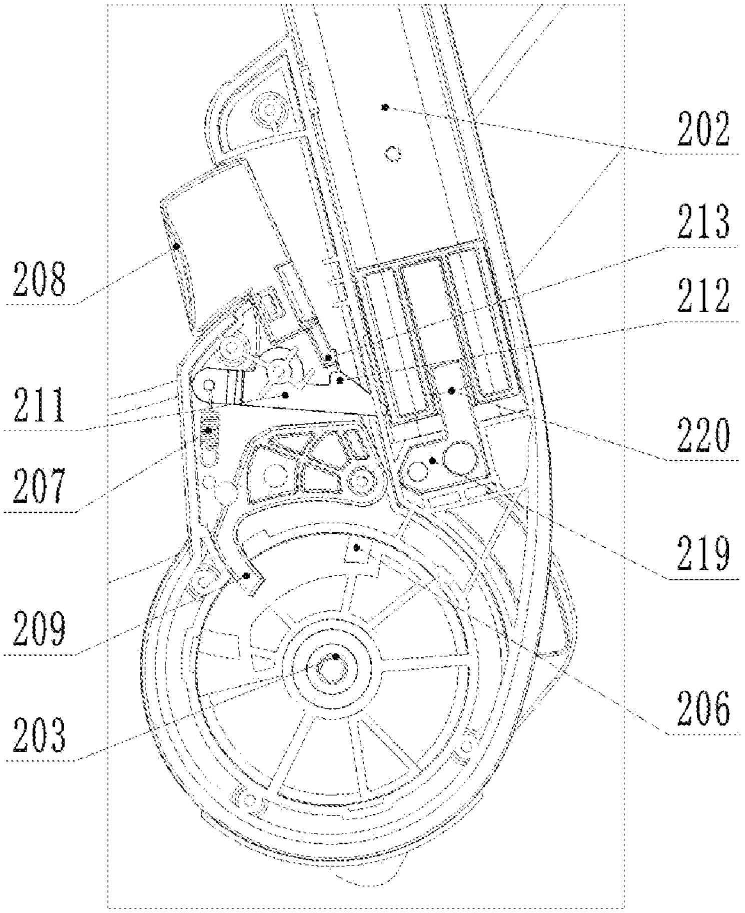
FIG. 14 is a partial enlarged view of B in FIG. 13 according to an embodiment of the present disclosure.

As shown in FIG. 10, a plurality of positioning slots 206 are distributed in a side surface of each of the connecting tables 203, buttons 207 are further provided and hinged relative to the handle connectors 204, each of the buttons 207 includes a pressing end 208 and a clamping jaw end 209, second elastic elements 210 are arranged between the buttons 207 and the handle connectors 204, and each of the second elastic elements 210 pushes the clamping jaw end 209 to be adapted to any one of the positioning slots 206. The buttons 207 are located inside the side cavities of the handle connectors 204, hinged parts of the buttons 207 are located between the pressing ends 208 and the clamping jaw ends 209, the second elastic elements 210 are springs, two ends of each second elastic element 210 are connected to the pressing end 208 and the handle connector 204 respectively, the handle connectors 204 are provided with side windows corresponding to the pressing ends 208, the second elastic elements 210 push the pressing ends 208 towards the side windows, and the clamping jaw ends 209 can be pushed by the second elastic elements 210 to be clamped in the positioning slots 206.

After the pressing ends 208 are pressed, the clamping jaw ends 209 are separated from the positioning slots 206 to unlock relative angles between the handle connectors 204 and the connecting tables 203, the handle connectors 204 are rotated, and after the clamping jaw ends 209 are adapted to other positioning slots 206, the relative angles between the handle connectors 204 and the connecting tables 203 are locked again.

In this embodiment, there are three positioning slots 206, and the corresponding handles 202 swing to an upper side, a rear side, and a front side of the basket body 201. Certainly, there may be more positioning slots 206 during actual use, such that the handles 202 have more angles.

As shown in FIGS. 11 to 14, the buttons 207 are arranged on the handle connectors 204, and the clamping jaw ends 209 can be adapted to any positioning slots 206, such that when the clamping jaw ends 209 are separated from the positioning slots 206, the handle connectors 204 and the connecting tables 203 can rotate mutually to change an angle, and when the clamping jaw ends 209 are pushed by the second elastic elements 210 to be adapted to the positioning slots 206, the handle connectors 204 cannot rotate relative to the connecting tables 203. Specifically, the buttons 207 maintain a trend of adaptively swinging the clamping jaw ends 209 towards the positioning slots 206 through the second elastic elements 210. Once the handle connectors 204 rotate to move the clamping jaw ends 209 to any positioning slots 206, the second elastic elements 210 will push the clamping jaw ends 209 of the buttons 207 to be clamped into the positioning slots 206, the pressing ends 208 of the buttons 207 are pressed to separate the clamping jaw ends 209 from the positioning slots 206, and then the handle connectors 204 can rotate relative to the basket body 201.

The buttons 207 are provided with hanging tables 213, lock plates 211 are further provided and hinged to the handle connectors 204, and third elastic elements 214 are provided between the lock plates 211 and the handle connectors 204;

hooks 212 are arranged on side edges of front ends of the lock plates 211, the hooks 212 of the lock plates 211 are pushed by the third elastic elements 214 to be adapted to the hanging tables 213, and the hooks 212 are configured to limit the pressing ends 208 to be pressed; and front ends of the third elastic elements 214 are pushed by the third elastic elements 214 to swing into the connecting cavities 205; and when the handles 202 are inserted into the connecting cavities 205, front ends of the handles 202 push the front ends of the lock plates 211 to swing, such that the hooks 212 are separated from the hanging tables 213.

A side edge of one side, where the corresponding handle 202 enters, of the front end of each third elastic element 214 is set as an inclined surface, such that the front end of the handle 202 can better push the lock plate 211 to swing; a joint between the lock plate 211 and the handle connector 204 is located in a middle of the lock plate 211; the third elastic element 214 is a tension spring connected to a rear end of the lock plate 211; and the tension spring pulls the lock plate 211 to make the front end of the lock plate 211 swing towards one side where the handle 202 is inserted, that is, swing towards one side where the hook 212 is adapted to the hanging table 213.

The lock plates 211 have two states. In a first state, the handles 202 are not inserted into the connecting cavities 205 of the handle connectors 204; the hooks 212 of the lock plates 211 hook the hanging tables 213 of the buttons 207 under the action of elastic force of the third elastic elements 214; the front ends of the lock plates 211 swing and extend into the connecting cavities 205 of the handle connectors 204; because the hooks 212 of the lock plates 211 hook the hanging tables 213, the buttons 207 cannot be pressed normally, and the clamping jaw ends 209 cannot be separated from the positioning slots 206, that is, the handle connectors 204 cannot rotate relative to the connecting tables 203 in the case where the handles 202 are not inserted into the connecting cavities 205 of the handle connectors 204. In a second state, the handles 202 are inserted into the connecting cavities 205 of the handle connectors 204; during the process that the handles 202 are inserted into the connecting cavities 205, the lock plates 211 are pushed to swing, and the front ends of the lock plates 211 are pushed out from the connecting cavities 205; after the front ends of the lock plates 211 are pushed out, the hooks 212 of the lock plates 211 are separated from the hanging tables 213, and the buttons 207 can be pressed; and after the buttons 207 are pressed, the clamping jaw ends 209 can be separated from the positioning slots 206, that is, the handle connectors 204 can rotate relative to the connecting tables 203 in the case where the handles 202 are inserted into the connecting cavities 205 of the handle connectors 204, thereby preventing the handles 202 from being accidentally touched to swing.

Clamping slots 215 are provided in side surfaces of the front ends of the handles 202, guide arc slots 216 are provided in end surfaces of the connecting tables 203, axes of the guide arc slots 216 are as same as rotation axes of the handle connectors 204, and each of the guide arc slots 216 comprises a clamping section 217 and a shallower separating section 218;

limit elements 219 and precompressed springs are further provided, the clamping slots 215 and the guide arc slots 216 are located on same sides of the limit elements 219, and the limit elements 219 are provided with clamping ends 220 corresponding to the clamping slots 215 and guide ends 221 corresponding to the guide arc slots 216 and are in sliding fit relative to the handle connectors 204; and the precompressed springs are arranged between the limit elements 219 and the handle connectors 204, and push the limit elements 219 to slide towards the clamping slots 215 and the guide arc slots 216. Specifically, sliding rods are arranged in the handle connectors 204, and the limit elements 219 are in sliding fit with the sliding rods, such that the limit elements 219 are in sliding fit relative to the handle connectors 204; and the sliding rods away from the clamping ends 220 and the guide ends 221 are provided with the precompressed springs.

When the guide ends 221 are matched with the clamping sections 217, the clamping ends 220 are adapted to the clamping slots 215, and when the guide ends 221 are matched with the separating sections 218, the clamping ends 220 are separated from the clamping slots 215. The clamping ends 220 are clamping hooks adapted to the clamping slots 215, and the guide ends 221 are bosses extending into the guide arc slots 216.

The limit elements 219 are in sliding fit relative to the handle connectors 204, and the precompressed springs push the limit elements 219 to slide towards the clamping slots 215 and the guide arc slots 216. When the guide ends 221 are matched with the clamping sections 217, because the clamping sections 217 are deeper, the limit elements 219 can be adaptively pushed by the precompressed springs to cause the clamping ends 220 to be adapted to the clamping slots 215. When the guide ends 221 are matched with the separating sections 218, the separating sections 218 are shallower and push the guide ends 221, such that the limit elements 219 can overcome pushing force of the precompressed springs to separate the clamping ends 220 from the clamping slots 215, that is, the clamping ends 220 and the guide ends 221 get close to or away from the clamping slots 215 and the guide arc slots 216 synchronously. The positions of the guide ends 221 in the guide arc slots 216 are obtained by rotating the handle connectors 204. When the guide ends 221 rotate to the separating sections 218, the clamping ends 220 are separated from the clamping slots 215, and the front ends of the handles 202 are not limited by the clamping ends 220 and can be pulled out from the connecting cavities 205.

With this solution, the apparatus can achieve a three-in-one function of a child seat, a stroller, and a basket, and may arbitrarily switch from the baby stroller to the child safety seat; the functions of the basket and the stroller are achieved through separation and combination of the frame set 1 and the basket set 2; the apparatus can be combined with a car seat by folding the frame set 1 and adjusting an angle of the handles 202 to achieve the effect of the child safety seat; and the apparatus is stable in overall structure, easy to deform, and very convenient to use.

The technical features of the above embodiments may be combined arbitrarily. For the sake of brevity, all possible combinations of the technical features in the above embodiments are not described. However, the combinations of these technical features should be considered to be within the scope of this specification as long as there is no contradiction between them.

The above embodiments only express several implementations of this application and are described more specifically and detailedly, but they should not be construed as a limitation to the scope of the patent of the invention. It should be pointed out that several modifications and improvements may also be made by those of ordinary skill in the art without departing from the conception of this application, and all fall within the scope of protection of this application. Therefore, the scope of patent protection of the present disclosure should be determined by the appended claims.

What is claimed is:

1. A child seat and stroller three-in-one apparatus, comprising:

a frame set, wherein the frame set comprises a base, front feet, rear feet, and lock pins; and a basket set, the basket set comprises handles, handle connectors, and connecting tables which allow the handle connectors to swing backwards and forwards;

wherein the frame set is inserted and matched with the basket set;

wherein rotating shafts are arranged on two sides of the base respectively, shaft holes in running fit with the rotating shafts are provided in upper ends of the front feet and the rear feet respectively, and the upper ends of the front feet and the rear feet are connected in series to and matched with the rotating shafts; and wherein the base on peripheries of the rotating shafts is axially provided with the lock pins in a sliding manner, first locking holes and second locking holes are provided in side surfaces of the upper ends of the front feet in a manner of corresponding to the lock pins, third locking holes and fourth locking holes are provided in side surfaces of the upper ends of the rear feet in a manner of corresponding to the lock pins, when the front feet and the rear feet are unfolded forwards and backwards, the lock pins simultaneously penetrate into the first locking holes and the third locking holes, and when both the front feet and the rear feet swing to a rear side of the basket set, the lock pins simultaneously penetrate into the second locking holes and the third locking holes;

wherein clamping slots are provided in side surfaces of front ends of the handles, guide arc slots are provided in end surfaces of the connecting tables, axes of the guide arc slots are on the same rotation axes as the handle connectors, and each of the guide arc slots comprises a clamping section and a shallower separating section;

wherein limit elements with precompressed springs are further provided on the handles, the clamping slots and the guide arc slots are located on the same sides as the limit elements, the limit elements are provided with clamping ends corresponding to the clamping slots and guide ends corresponding to the guide arc slots and are in sliding fit relative to the handle connectors, and the precompressed springs are arranged between the limit elements and the handle connectors, and push the limit elements to slide towards the clamping slots and the guide arc slots; and wherein when the guide ends of the limit elements are matched with the clamping sections of the guide arc slots, the clamping ends of the limit elements are adapted to engage with the clamping slots of the handles, and when the guide ends of the limit elements are matched with the shallower separating sections of the guide arc slots, the clamping ends are separated from the clamping slots.

2. The child seat and stroller three-in-one apparatus according to claim 1, wherein the lock pins are connected to first springs, the first springs drive the lock pins to move towards the front feet and the rear feet, the base is provided with a pull handle and steel wires, the pull handle is in sliding fit with the base and is connected to the lock pins through the steel wires, and when the pull handle is pulled, the steel wires drive the lock pins to move away from the front feet and the rear feet.

3. The child seat and stroller three-in-one apparatus according to claim 2, wherein the base is provided with a fastening slot, a double lock catch is provided and comprises a hanging and fastening end and an operating end, the double lock catch is hinged to the pull handle, and a first elastic element is arranged between the double lock catch and the pull handle, and drives the hanging and fastening end of the double lock catch to be hung in the fastening slot.

4. The child seat and stroller three-in-one apparatus according to claim 1, wherein second springs are arranged between the front feet and the rear feet, and push the front feet and the rear feet to expand.

5. The child seat and stroller three-in-one apparatus according to claim 1, wherein arc-shaped slots are provided in end surfaces, close to the rear feet, of the front feet, have the same axis as the rotating shafts, and connect the first locking holes to the second locking holes in series, arc-shaped plates are provided on end surfaces, close to the front feet, of the rear feet in a manner of corresponding to the arc-shaped slots, each of the arc-shaped plates is high in a middle and low on two sides, and the arc-shaped plates are located between the third locking holes and the fourth locking holes.

6. The child seat and stroller three-in-one apparatus according to claim 1, wherein the basket set comprises a basket body, and connecting seats detachably connected to the basket body are upwards arranged on two sides of the base respectively.

7. The child seat and stroller three-in-one apparatus according to claim 6, wherein the connecting tables and the handle connectors are arranged on two sides of the basket body respectively, one end of each of the handle connectors is in running fit with a corresponding one of the connecting tables, and the handle connectors are provided with connecting cavities inserted and matched with the handles.

8. The child seat and stroller three-in-one apparatus according to claim 7, wherein a plurality of positioning slots are distributed in a side surface of each of the connecting tables, buttons are further provided and hinged relative to the handle connectors, each of the buttons comprises a pressing end and a clamping jaw end, second elastic elements are arranged between the buttons and the handle connectors, and each of the second elastic elements pushes the clamping jaw end to be adapted to any one of the positioning slots; and after the pressing ends are pressed, the clamping jaw ends are separated from the positioning slots to unlock relative angles between the handle connectors and the connecting tables, the handle connectors are rotated, and after the clamping jaw ends are adapted to other positioning slots, the relative angles between the handle connectors and the connecting tables are locked again.

9. The child seat and stroller three-in-one apparatus according to claim 8, wherein the buttons are provided with hanging tables, lock plates are further provided and hinged to the handle connectors, and third elastic elements are provided between the lock plates and the handle connectors;

hooks are arranged on side edges of front ends of the lock plates, the hooks of the lock plates are pushed by the third elastic elements to be adapted to the hanging tables, and the hooks are configured to limit the pressing ends to be pressed;

front ends of the third elastic elements are pushed by the third elastic elements to swing into the connecting cavities; and when the handles are inserted into the connecting cavities, front ends of the handles push the front ends of the lock plates to swing, such that the hooks are separated from the hanging tables.

* * * * *